United States Patent

Martin et al.

[11] Patent Number: 5,835,607
[45] Date of Patent: Nov. 10, 1998

[54] MOBILE RADIOTELEPHONE WITH HANDSFREE DEVICE

[75] Inventors: Rainer Martin, Aachen, Germany; Kees Janse; Charles Knibbler, both of Eindhoven, Netherlands; Walter Kellermann, Eckental, Germany

[73] Assignee: U.S. Philips Corporation, New York, N.Y.

[21] Appl. No.: 424,257
[22] PCT Filed: Sep. 7, 1994
[86] PCT No.: PCT/IB94/00265
   § 371 Date: Jun. 12, 1995
   § 102(e) Date: Jun. 12, 1995
[87] PCT Pub. No.: WO95/07597
   PCT Pub. Date: Mar. 16, 1995

[30] Foreign Application Priority Data

Sep. 7, 1993 [DE] Germany .......................... 43 30 143.6

[51] Int. Cl.⁶ .................................................. H04B 15/00
[52] U.S. Cl. .......................... 381/94.1; 381/92; 379/406; 379/410; 379/411
[58] Field of Search ................................... 381/94, 71, 92; 379/58, 59, 410; 367/119, 121, 123, 125

[56] References Cited

U.S. PATENT DOCUMENTS

| | | | |
|---|---|---|---|
| 4,536,887 | 8/1985 | Kaneda et al. | 381/92 |
| 4,696,043 | 9/1987 | Iwahara et al. | 381/92 |
| 4,802,227 | 1/1989 | Elko et al. | 381/92 |
| 5,058,170 | 10/1991 | Kanamori | 381/94 |
| 5,226,087 | 7/1993 | Ono et al. | 381/92 |
| 5,473,702 | 12/1995 | Yoshida et al. | 381/94 |
| 5,559,881 | 9/1996 | Sih | 379/410 |

FOREIGN PATENT DOCUMENTS

| | | | |
|---|---|---|---|
| 53-0108419 | 9/1978 | Japan | 381/92 |
| 56-152337 | 11/1981 | Japan | 381/94 |
| 0008100 | 1/1992 | Japan | 381/92 |
| 595596 | 4/1993 | Japan | 381/94 |
| 5161191 | 6/1993 | Japan | 381/94 |
| 6269083 | 9/1994 | Japan | 381/94 |

OTHER PUBLICATIONS

A Microphone Array with Adaptive Postfiltering for Noise Reduction in Reverberant Room by Rainer Zelinski, ICASSP 88, pp. 2578 to 3581.

Primary Examiner—Curtis A. Kuntz
Assistant Examiner—Duc Nguyen
Attorney, Agent, or Firm—Steven R. Biren

[57] ABSTRACT

A mobile radio transceiver comprising a hands-free facility, which hands-free facility combines at least two acoustic input signals to produce an output signal, and an adaptive filter is provided for filtering the combined output signal. To achieve an improved speech quality, a high-pass filter is provided for filtering the acoustic input signals.

10 Claims, 1 Drawing Sheet

MOBILE RADIOTELEPHONE WITH HANDSFREE DEVICE

BACKGROUND OF THE INVENTION

1. Field of the Invention

The invention relates to a mobile radio transceiver with a hands-free facility, which hands-free facility comprises combining means for combining at least two acoustic input signals, and an adaptive filter for filtering the combined output signal of the combining means.

The invention further relates to a hands-free facility which comprises combining means for combining at least two acoustic input signals, and an adaptive filter for filtering the combined output signal of the combining means.

2. Discussion of the Related Art

A hands-free facility with four microphones is known, for example, from "A MICROPHONE ARRAY WITH ADAPTIVE POSTFILTERING FOR NOISE REDUCTION IN REVERBERANT ROOM" by Rainer Zelinski, ICASSP 88, pp. 2578 to 2581. In a first processing step the directivity gain of the two-dimensionally arranged microphones is used for noise reduction. In a second processing step the microphone signals are further processed by an adaptive Wiener filter which estimates the desired speech signal. For computing the parameters of the Wiener filter the autocorrelation function and the crosscorrelation function of the input signals are measured.

SUMMARY OF THE INVENTION

It is an object of the invention to improve the speech quality in a mobile radio transceiver and in a hands-free facility of the type defined in the opening paragraph.

In a mobile radio transceiver as well as in a hands-free facility of the type defined in the opening paragraph this object is achieved in that a high-pass filter is provided for filtering the acoustic input signals.

The invention is based on the recognition that various undesired side effects occur as a result of the large noise component in the microphone signals i.e., in the acoustic input signals in a motor car when the parameters for the adaptive filter are computed, which side effects lead to a degradation of the speech quality of the output signal. For processing the acoustic analog input signals coming from a group of microphones arranged in an array, these input signals are first converted, for example, into digital signals by analog-to-digital converters. The combining means following in the circuit are used for combining the digital input signals thus obtained to an output signal that contains the least possible interference. The adaptive filter arranged downstream of the combining means is used for reducing disturbing noise which often occurs with a hands-free facility arranged in a motor car, for example, as a result of engine noise. Especially the use of high-grade microphones may call forth a degradation of the output signal of the hands-free facility.

In accordance with a principle of the invention the high-pass filtering of the acoustic input signals surprisingly simply achieves a reduction of these effects. For example, a $4^{th}$ order digital infinite impulse response (IIR) filter can be used as a high-pass filter. Subjecting the input signals to such a high-pass filtering provides that the poorer signal processing relating to the low-frequency portions of the input signals in the hands-free facility may be omitted, so that on the whole an improvement of the speech quality of the output signal of the hands-free facility of the mobile radio transceiver is obtained. This achieves that the relatively high signal energy of the low-frequency range, which energy is mainly formed by interference signals, is filtered out and thus an improvement of the speech quality of the hands-free facility and thus of the mobile radio transceiver is effected.

An improved speech quality of the hands-free facility of the mobile radio transceiver may be achieved when the limit frequency of the high-pass filter lies in the range from 200to 400 Hz. Especially with a 300 Hz limit frequency of the high-pass filter a considerable improvement of the output signal could be realised, as frequencies lying below 300 Hz do not play a role anyway in telephone speech relating to a mobile radio transceiver.

A further improvement of the speech quality of the hands-free facility may be ensured in that a further high-pass filter is provided for filtering the output signal of the adaptive filter, in accordance with an aspect of the invention. The further high-pass filtering may reduced further low-frequency interference signal portions that have not been sufficiently suppressed by the adaptive filter. This is based on the recognition that as a result of the time variance of the adaptive filter, additional phenomena occur of which the energy is concentrated on the lower frequency range even if the input signals do not contain low-frequency signal portions. The further high-pass filtering attenuates these low-frequency signal portions and simultaneously increases the higher signal frequencies, so that a dull sound impression otherwise caused by a faulty reaction to an attenuation of the high-frequency signal portions is avoided.

A further improved speech quality of the hands-free facility of the mobile radio transceiver may be achieved when the limit frequency of the further high-pass filter lies in the range from 200 to 400 Hz. A considerable improvement of the output signal could be achieved especially with a 300 Hz limit frequency of the further high-pass filter.

Differences of delay of the acoustic input signals recorded by, for example, a microphone array, may be simply taken into account in that the combining means comprise a delay equalization means for equalizing the differences between the input signals. Therefore, the delay equalization means is inserted between the microphone and the input signal summation circuit and used for equalizing the delay differences based on the time offsets between the speech signal portions of the acoustic input signals i.e. of the microphone signals.

In accordance with an aspect of the invention, a further improvement of the speech quality may be achieved in by including the delay equalization means, plausibility examining means provided for examining whether a defined distance and/or direction from the starting point of the output signals to a speaker exceeds a predefined limit value. During such a plausibility examination there is examined whether a defined distance to the speaker is exceeded by the predefined limit value when the speaker is focused at, while this limit value can be selected in accordance with the inside measurements of the motor car. Additionally, the direction from which the input signals are recorded can also be taken into account for the plausibility examination as a result of which erroneous, i.e., impossible speaker locations, for example a speaker location behind the microphones, can be excluded.

A particularly poor speech quality occurring as a result of erroneously estimated correlation functions and/or numerical problems can be improved in that the hands-free facility comprises an arrangement for computing the parameters of the adaptive filter from the autocorrelation function and the cross-correlation function of the input signals, while especially the autocorrelation function and/or cross-correlation function are averaged with time.

An advantageous possibility for computing the cross-correlation function is that the autocorrelation function is scaled and the cross-correlation function is affected by the autocorrelation function.

Annoying effects during hands-free operation may simply be further reduced in that the hands-free facility comprises switching means provided for not using the adaptive filter when there is a coefficient overflow during the computation of the autocorrelation function and/or the cross-correlation function.

A Wiener filter may be suitably used as the adaptive filter.

BRIEF DESCRIPTION OF THE DRAWINGS

In the following the invention will be further explained with reference to the exemplary embodiments shown in the drawing Figures in which.

DETAILED DESCRIPTION OF THE PREFERRED EMBODIMENTS

Figure 1:
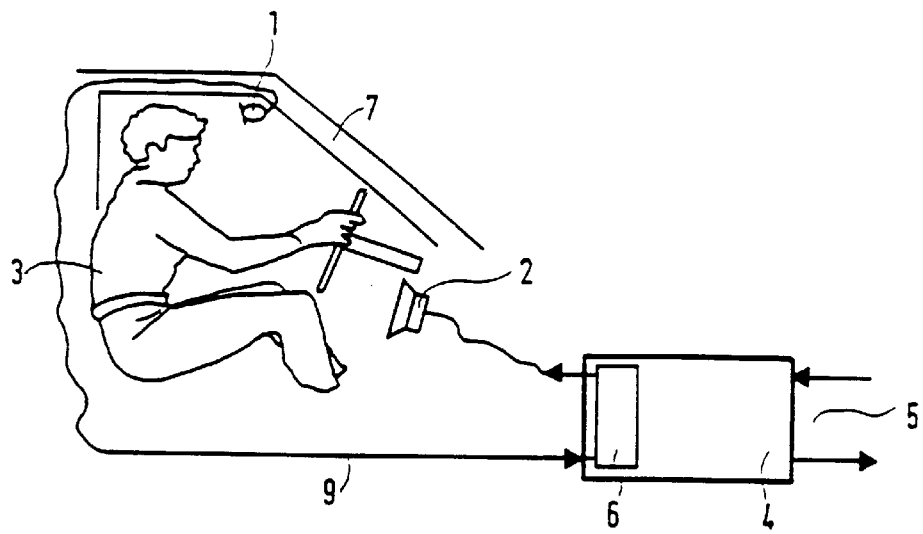
FIG. 1 shows a cutaway view of a motor car with a diagrammatically represented hands-free facility.

FIG. 1 shows in a diagram a cutaway view of a motor car 7 with a driver 3. FIG. 1 further shows that a mobile telephone 4 with a hands-free facility 6 is arranged in the motor car, while the hands-free facility 6 radiates a signal received from a remote subscriber via a loudspeaker 2 into the acoustic environment i.e. into the inside of the motor car 7 and is thus audible to the local subscriber 3 ("loud hearing operation"). A microphone group 1 is arranged over the speaker 3 in the motor car 7, which microphone group captures the speech of the speaker 3 as well as further acoustic signals from the environment to send them as acoustic input signals 9 via the hands-free facility 6 and the mobile radio transceiver 4 to a remote subscriber connected to the mobile radio transceiver 4 by a radio channel 5 ("hands-free operation"), while in the following "hands-free operation" is always intended to be understood as the combination of the two functions of "loud hearing operation" and "hands-free operation". The hands-free facility 6 arranged inside the motor car may form both a constituent part of the mobile radio transceiver 4 and be connected to the mobile radio transceiver 4 as a separate arrangement. The further components normally used for the operation of a mobile radio transceiver are not shown in the exemplary embodiment shown in FIG. 1 for clarity.

During hands-free operation in a motor car, fundamental problems occur. On the one hand, the microphone 1 or the microphone group 1 respectively, captures not only the desired speech signal of the speaker 3 but also other signals from the acoustic environment, which other signals can be classified into two categories with respect to the available technical solutions. They are, on the one hand, the acoustic echo of the loudspeaker signal and, on the other hand, the local noise which may be caused by, for example, engine, ventilation, tyres, wind, rain and so on. These signals act as a disturbance on the actual useful signal i.e. the voice of the local subscriber 3 and may thus decisively affect the speech quality of the telephone link established by the mobile radio transceiver 4 and the radio channel 5. They degrade the understandability of the useful signal and impair the quality thereof also when a speech coding method is used. The impairing effect also enhances when the transmission bit rate is reduced, for example, with GSM codecs and the recognition rate of voice recognizers which, for example, can be provided for voice-controlled operation of the mobile telephone 4 is reduced. For the actual telephone operation realised via the mobile radio transceiver 4, the two former effects are important, whereas only the remote subscriber will be conscious thereof. For example, the remote subscriber will hear the echo of his own voice (after about 30 ms signal delay i.e. with GSM with about 180 ms delay all the more distinctly), and he will perceive the effects of local noise as impaired speech quality. The local subscriber 3 will experience reactions only if the feedback of the loudspeaker signal to the microphone 1 causes stability problems to occur in the telephone connection. With respect to the voice recognition functions, for example, when the mobile telephone 4 is voice controlled, the local subscriber will immediately sense the effects of the disturbances by the degradation of the recognition rates.

In addition to the desired loudspeaker signal 2 and the associated echoes, the local subscriber 3 naturally additionally hears the local noise, so that the sound impression and the understandability are accordingly impaired when there is a high additional noise level. To remove the local noise from the microphone signals 1, various concepts for noise reduction can be used. In principle, one always tries to analyze the useful signal and the noise signal separately and to suppress the noise signal in response to the properties found, without simultaneously affecting the useful signal.

Figure 2:
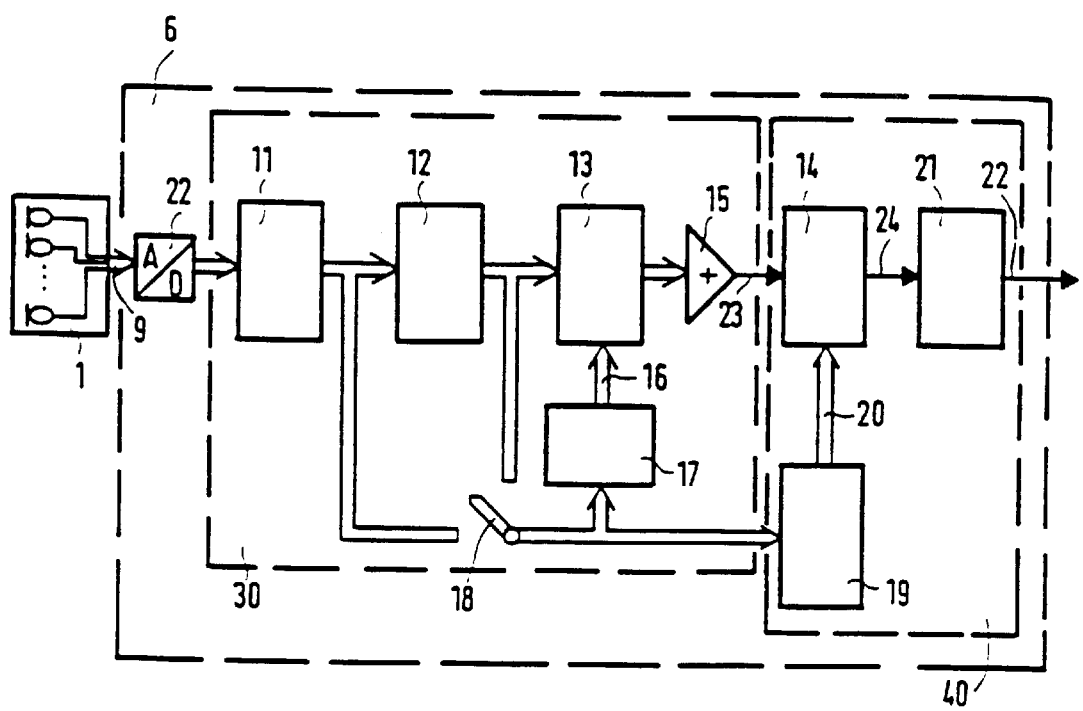
FIG. 2 shows an embodiment for a hands-free facility.

FIG. 2 shows an exemplary embodiment for a hands-free facility 6 as it can be used in combination with or inside a mobile radio transceiver 4 shown in FIG. 1 (cf. FIG. 1). The hands-free facility 6 shown in FIG. 2 comprises a microphone group 1 arranged, for example, as a microphone array, whose acoustic input signals 9 captured by the individual microphones are applied via an analog-to-digital converter 22 to a high-pass filter 11 to be filtered. The high-pass filter 11 forms part of the combining means 30 which are arranged for combining the input signals 9, while the combining means 30 further include an arrangement 12 for optimum weighting of the input signals, a delay equalization circuit 13, a delay estimator 17 as well as a summation circuit 15. A combined input signal 23 available on the output of the combining means 30 is fed to an adaptive filter 14 which, together with the filter estimator 19, forms the filter means 40 of the hands-free facility 6. For filtering the output signal 24 of the adaptive filter 14 there is additionally provided a further high-pass filter 21 which produces the output signal 22 of the hands-free facility 6. In the exemplary embodiment for a hands-free facility 6 shown in FIG. 2 only the parts of the hands-free facility relevant to the scope of the invention are shown, while a representation of the further components of a customary hands-free facility has been omitted for clarity.

The acoustic input signals 9 captured by the microphone group 1 are first converted into digital signals by converting means 22 (A/D converters). The subsequent combining means 30 are used for converting the digital input signals thus obtained into a minimum-noise output signal 23 whose quality is to be further improved by the subsequent filter means 40. For this purpose, the digitized input signals 9 are first high-pass filtered by high-pass filter 11 in the hands-free facility 6 shown in FIG. 2, so that in a surprisingly simple manner interference in the acoustic input signals 9 can be reduced. Such a high-pass filter may be arranged, for example, as a $2^{nd}$ to $4^{th}$ order digital IIR (Ifinite Impulse Response) filter. For example, 300 Hz is used as a limit frequency of the high-pass filter 11. Frequencies below 300

Hz do not play any role for the speech signals to be processed for a mobile radio transceiver and the telephone speech resulting therefrom. Arrangement 12 performs an optimum weighting of the high-pass filtered input signals in a known manner, while the high-pass filtered input signals on the output of the high-pass filter 11 are also used for estimating a delay for the delay estimator 16 as well as for the filter estimator 19 for estimating the parameters 20 of the adaptive filter 14.

Before the input signals are combined by the summation circuit 15, the delays of the input signals 9 of the microphone group 1 are equalized by the delay equalization circuit 13 in the exemplary embodiment for the hands-free facility 6 shown in FIG. 2. For this purpose the delay equalization circuit 13 comprises plausibility examining means provided for examining whether a defined distance from the starting point of the input signals 9 to a speaker exceeds a predeterminable limit value. Such a plausibility examining circuit therefore investigates whether the defined distance to a speaker exceeds a predeterminable limit value when the speaker is focused at. This limit value can be selected in accordance with the inside dimensions of the motor car. For example, distances over one meter would mean that the speaker must be outside the vehicle. Additionally, the direction of the input signals can be taken into consideration for such a plausibility examination. As a result, supposed speaker positions, for example, behind the microphones, thus in the direction of the windscreen, may be recognized as unlikely as may be speaker positions to the left of the driver's position. When an unlikely speaker position is recognized, preferably the most recent plausible speaker position, i.e. the previous estimates, is used. This may be ensured by the switching means 18 included in the combining means 30 shown in FIG. 2. The microphone array 1 with its subsequent delay equalization makes it possible to separate useful and noise components in the input signals 9 by its spatial selectivity. Simultaneously, an additional array gain is achieved when the useful signal source is focused at and the individual microphone signals 9 are averaged, if the noise components in the microphone signals are alternately uncorrelated and are therefore partly cancelled during the summation.

It is an object of the subsequent adaptive filter 14 of the filter means 40 to accentuate the useful portions of the combining signal 23 and additionally suppress the remaining noise signals. For this purpose, the autocorrelation function and the cross-correlation function of the input signals 9 are computed as parameters for the adaptive filter 14 arranged, for example, as a Wiener filter, via the filter estimator 19. Furthermore, there is examined whether a coefficient overflow has occurred during the computation of autocorrelation function and/or cross-correlation function and in that case the adaptive filter 14 is not to be used. This may also be effected by the switching means 18. The further high-pass filter 21 can filter out the low-frequency noise signal components in the signal 24 available on the output of the adaptive filter 14, which components are insufficiently suppressed by the adaptive filter 14, so that the output signal 22 of the hands-free facility 6 has a further enhanced speech quality.

We claim:

1. A mobile radio transceiver with a hands-free facility, said hands-free facility comprising:

means for combining at least two acoustic input signals and providing a combined output signal, said means for combining comprising a delay equalization circuit for equalizing delays between the input signals, said delay equalization circuit comprising plausibility examining means for examining whether a defined distance and/or direction from a starting point of the input signals to a speaker exceeds a predeterminable limit value;

an adaptive filter for filtering the combined output signal of said combining means; and means for high-pass filtering each of the acoustic input signals.

2. The mobile radio transceiver as claimed in claim 1, further comprising an arrangement for computing parameter of said adaptive filter from an autocorrelation function and a cross-correlation function of the input signals, wherein the autocorrelation function and/or cross-correlation function are averaged with time.

3. The mobile radio transceiver as claimed in claim 2, further wherein for computing the cross-correlation function the autocorrelation function is scaled and the cross-correlation function is affected by the autocorrelation function.

4. The mobile radio transceiver as claimed in claim 3, further comprising switching means for not using the adaptive filter when there is a coefficient overflow during a computation of the autocorrelation function and/or the cross-correlation function.

5. The mobile radio transceiver as claimed in claim 4, wherein the adaptive filter is a Wiener filter.

6. A hands-free facility comprising:

means for combining at least two acoustic input signals and providing a combined output signal, said means for combining comprising a delay equalization circuit for equalizing delays between the input signals, said delay equalization circuit comprising plausibility examining means for examining whether a defined distance and/or direction from a starting point of the input signals to a speaker exceeds a predeterminable limit value;

an adaptive filter for filtering the combined output signal of said combining means;

a high-pass filter for filtering the acoustic input signals; and a further high-pass filter for filtering an output signal of said adaptive filter, the limit frequency of the further high-pass filter lying in the range from 200to 400 Hz.

7. The hands-free facility as claimed in claim 6, further comprising an arrangement for computing parameters of said adaptive filter from an autocorrelation function and a cross-correlation function of the input signals, wherein the autocorrelation function and/or crosscorrelation function are averaged with time.

8. The hands-free facility as claimed in claim 7, further wherein for computing the cross-correlation function the autocorrelation function is scaled and the crosscorrelation function is affected by the autocorrelation function.

9. The hands-free facility as claimed in claim 8, further comprising switching means for not using the adaptive filter when there is a coefficient overflow during a computation of the autocorrelation function and/or the cross-correlation function.

10. The hands-free facility as claimed in claim 9, wherein the adaptive filter is a Wiener filter.

* * * * *